(12) United States Patent
Maciolek et al.

(10) Patent No.: US 10,866,972 B2
(45) Date of Patent: Dec. 15, 2020

(54) SYSTEMS AND METHODS FOR TRIE-BASED AUTOMATED DISCOVERY OF PATTERNS IN COMPUTER LOGS

(71) Applicant: Sumo Logic, Redwood City, CA (US)

(72) Inventors: Przemyslaw Maciolek, Cracow (PL); Daniel Cincunegui, Ciudad Autonoma de Buenos Aires (AR); Krzysztof Koszyka, Cracow (PL)

(73) Assignee: Sumo Logic, Redwood City, CA (US)

(*) Notice: Subject to any disclaimer, the term of this patent is extended or adjusted under 35 U.S.C. 154(b) by 291 days.

(21) Appl. No.: 15/237,559

(22) Filed: Aug. 15, 2016

(65) Prior Publication Data

US 2018/0046697 A1    Feb. 15, 2018

(51) Int. Cl.
    *G06F 16/28*      (2019.01)
    *G06F 16/2452*    (2019.01)
    *G06F 16/2457*    (2019.01)

(52) U.S. Cl.
    CPC ........ *G06F 16/285* (2019.01); *G06F 16/2452* (2019.01); *G06F 16/24575* (2019.01)

(58) Field of Classification Search
    CPC ......... G06F 17/30598; G06F 17/30427; G06F 17/30528; G06F 16/285; G06F 16/24575; G06F 16/2452
    See application file for complete search history.

(56) References Cited

U.S. PATENT DOCUMENTS

| | | | | |
|---|---|---|---|---|
| 6,614,789 B1* | 9/2003 | Yazdani | ................. | H04L 45/00 370/392 |
| 6,785,677 B1* | 8/2004 | Fritchman | ......... | G06F 17/30477 |
| 6,970,971 B1* | 11/2005 | Warkhede | ............... | H04L 45/00 365/49.1 |
| 7,929,534 B2* | 4/2011 | Poletto | ................ | H04L 63/1425 370/392 |
| 8,032,489 B2* | 10/2011 | Villella | ............... | G06F 11/3476 707/622 |
| 8,271,403 B2* | 9/2012 | Rieck | ........................ | G06F 7/02 706/12 |
| 8,380,758 B1* | 2/2013 | Stephens | ............. | G06F 9/45512 370/392 |
| 8,495,429 B2* | 7/2013 | Fu | ........................ | G06F 11/3608 714/25 |
| 8,554,907 B1* | 10/2013 | Chen | ................... | H04L 63/1425 370/242 |
| 8,626,696 B2* | 1/2014 | Lambov | ............ | G06F 17/30985 706/48 |
| 8,630,989 B2* | 1/2014 | Blohm | ................. | G06F 17/278 707/705 |
| 8,949,251 B2* | 2/2015 | Thomas | ............ | H04L 29/12641 707/749 |
| 8,949,418 B2* | 2/2015 | Bray | ...................... | H04L 63/02 709/224 |
| 9,075,718 B2* | 7/2015 | Hinterbichler | ...... | G06F 11/3656 |
| 9,166,993 B1* | 10/2015 | Liu | ..................... | H04L 63/1425 |

(Continued)

*Primary Examiner* — Miranda Le
(74) *Attorney, Agent, or Firm* — Van Pelt, Yi & James LLP

(57) ABSTRACT

Systems and methods for tokenization of log records for efficient data storage, log querying, and log data analytics can utilize a trie pattern conversion of the log files, storing trie data pattern IDs, free parameters, and metadata instead of the entire log record. New trie patterns can be discovered automatically by counting the occurrences of tokens matching wildcards for existing patterns.

2 Claims, 16 Drawing Sheets

(56) References Cited

U.S. PATENT DOCUMENTS

| | | | | |
|---|---|---|---|---|
| 9,479,479 | B1* | 10/2016 | Tulasi | H04L 63/0263 |
| 9,497,206 | B2* | 11/2016 | Bernstein | H04L 63/1425 |
| 10,038,710 | B2* | 7/2018 | Bersch | G06F 16/285 |
| 2004/0133672 | A1* | 7/2004 | Bhattacharya | H04L 63/1416 |
| | | | | 709/224 |
| 2008/0222706 | A1* | 9/2008 | Renaud | H04L 63/1408 |
| | | | | 726/4 |
| 2015/0154269 | A1 | 6/2015 | Miller et al. | |
| 2015/0222477 | A1* | 8/2015 | Ranjan | H04L 41/0631 |
| | | | | 709/223 |
| 2016/0197952 | A1* | 7/2016 | Fujimoto | H04L 63/1416 |
| | | | | 726/23 |
| 2016/0292599 | A1* | 10/2016 | Andrews | G06Q 10/0635 |
| 2017/0126534 | A1* | 5/2017 | Cimino | H04L 67/2814 |
| 2017/0180403 | A1* | 6/2017 | Mehta | H04L 63/1416 |
| 2017/0249200 | A1* | 8/2017 | Mustafi | G06F 11/0709 |
| 2017/0324759 | A1* | 11/2017 | Puri | G06N 7/005 |

\* cited by examiner

US 10,866,972 B2

SYSTEMS AND METHODS FOR TRIE-BASED AUTOMATED DISCOVERY OF PATTERNS IN COMPUTER LOGS

FIELD OF INVENTION

The disclosure relates to data processing systems, including data mining systems. More particularly, the invention relates to monitoring, reporting, and anomaly detection systems, in which logs and their parameters are being the analyzed subject.

BACKGROUND

Computer logs are a useful source of information for monitoring the behavior of a computer or a system of computers. Logs (either in the form of log files or log data streams) are typically automatically generated text files listing timestamped computer hardware events, computer software events, or messages sent to or from a computer. In some cases, a system can generate a large number of log messages, distributed over several files or data streams, from multiple sources (different computers and/or different software applications). Therefore, computerized methods for datamining these log files need to be used to analyze the records.

Due to the nature of the logs, being automatically generated by software, the records follow patterns defined by the application generating the logs—similar events will be described in similar grammar and with a common set of keywords. For some logs, such as Apache Web Server logs, these patterns are commonly known and well defined. However, many logs will not have patterns known to the log reader ahead of time. Therefore, computerized methods for analyzing logs must have the ability to parse and understand all types of log patterns by specifying rules for parsing any given log format. Typically, this is done by manually defining parsing rules. For some systems, this requires significant manual effort.

There is a significant research on log clustering, however it is mostly based around grouping logs into sets based on their similarity. This is useful for determining generic classes of logs, but is not efficient for building descriptions of specific patterns.

US Patent Publication No. 2015/0154269A1 (filed as U.S. patent application Ser. No. 14/611,089) relates to formulating and refining field extraction rules that are used at query time on raw data with a late-binding schema. Specifically, it provides analysis tools and a wizard to allow a user without extensive programming experience or training to create one or more extraction rules that deliver data values from events in machine data. While this might make rulemaking easier, it is still a manual rulemaking system.

SUMMARY

The systems and methods described herein analyze and parse logs and determine patterns automatically, even if the patterns are not well defined. These systems and methods cluster the logs, retaining the order of tokens and parameters, and expressing the identified log patterns in a trie, allowing for automatic matching of patterns for incoming logs.

A first embodiment of this disclosure includes a computer system including a processor and a datastore, the system comprising: a log processing engine connected to the datastore and configured to: collect logs from a plurality of applications; tokenize the logs; match each record of the logs, from their tokens, to a pattern in a stored trie, each pattern having a unique pattern ID; extract free parameters and metadata from the logs; and store the logs to the datastore as combinations of the pattern IDs, the free parameters, and the metadata.

A second embodiment of this disclosure includes a computer-based method for storing computer logs, the method comprising: collecting logs from a plurality of applications; tokenizing, by a processor, the logs; matching, by the processor, each record of the logs, from their tokens, to a pattern in a stored trie, each pattern having a unique pattern ID; extracting, by the processor, free parameters and metadata from the logs; and storing the logs to the datastore as combinations of the pattern IDs, the free parameters, and the metadata.

BRIEF DESCRIPTION OF DRAWINGS

FIG. 3A depicts the set of patterns expressed through a trie. FIG. 3B depicts a log being unambiguously matched to a pattern. FIG. 3C depicts a log with ambiguous pattern matches.

DETAILED DESCRIPTION

Figure 1:
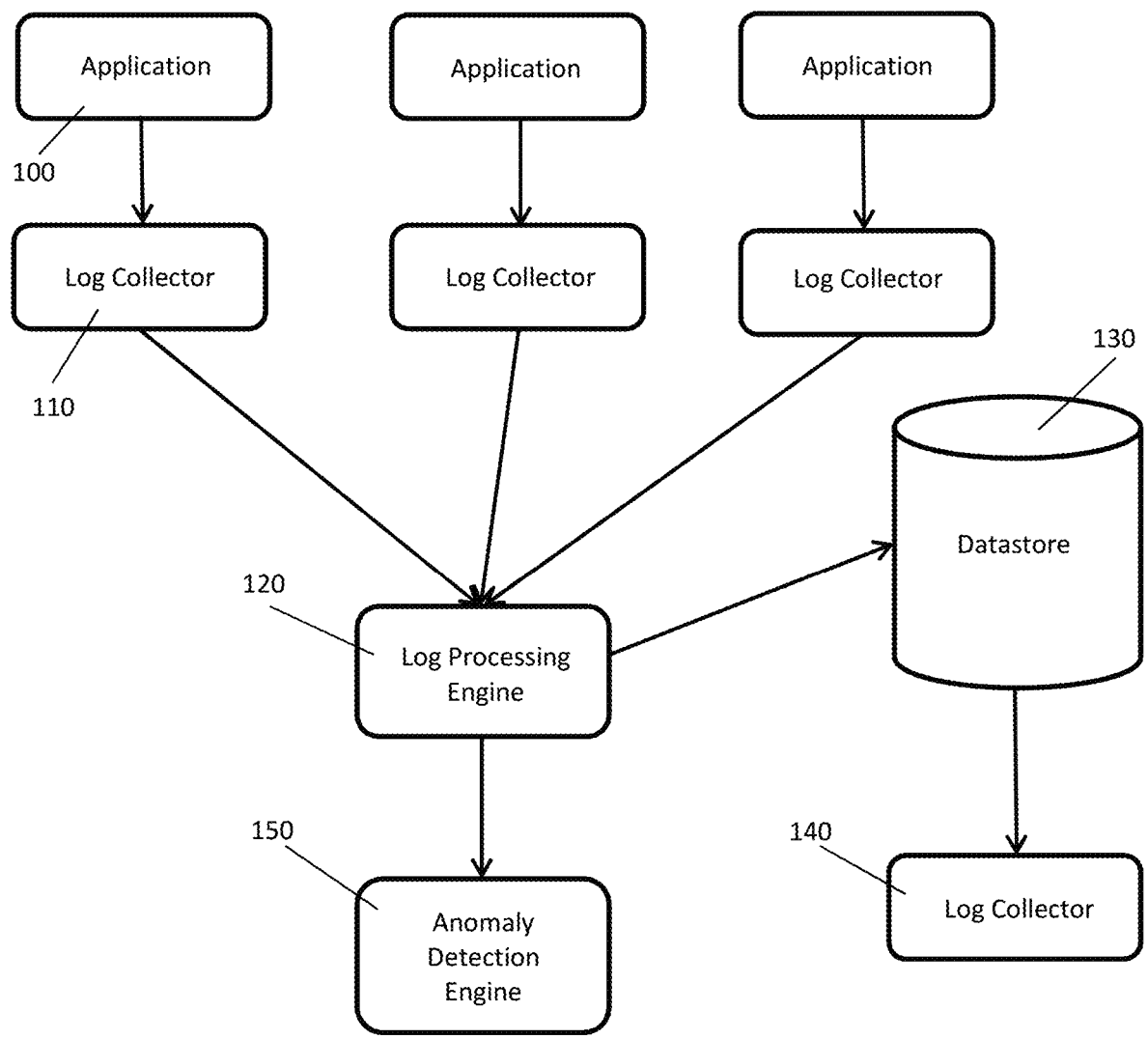
FIG. 1 depicts an example architecture for a system implementing an automatic log pattern discovery method.

FIG. 1 describes an example log monitoring scenario. A number of applications (100) create text logs, which are being captured by a log collector (110) and sent to a log processing engine (120). The engine parses the logs and stores the output in a datastore (130), which might be accessed by querying engine (140). An anomaly detection engine (150) can use the output of log processing engine for the purpose of real-time security and performance monitoring.

Two problems faced when implementing such a system are storing all of the logs, which for systems with multiple processors and multiple applications can require significant storage space, and efficiently making queries or performing analytics on the resulting logs. Both of these issues can be addressed by utilizing trie data structures for the logs. A trie, also known as a "digital tree" or "radix tree" or "prefix tree", is an ordered data structure that can be used to store an associative array of keys. The position of each node in the tree defines the key with which it is associated. Herein the positions of the nodes are identified by their "pattern IDs", which are assigned as the nodes are created. Trie structures offer faster querying speeds than binary search trees in the worst case scenario.

Figure 2:
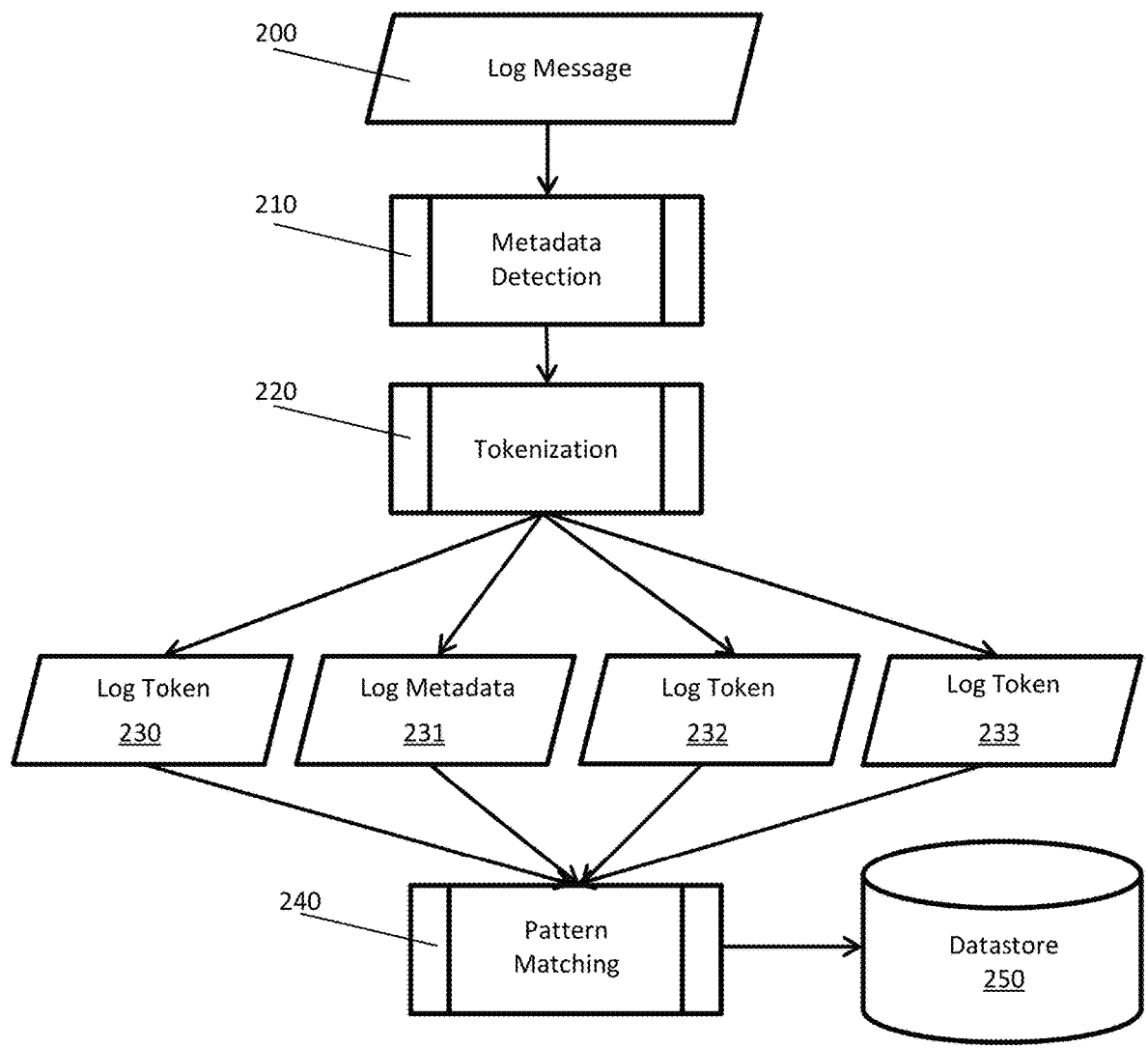
FIG. 2 depicts an example log processing chain.

FIG. 2 presents an example single log message handling process utilizing a trie data structure. The text message (200) is a subject of metadata detection (210), detecting data such as IP address or timestamp, and then tokenization (220) which uses a set of rules to break down the array of characters into a sequence of tokens (230, 232, 233) to be used as keys for the trie. The discovered metadata is a special type of token (231) that is skipped by the tokenization, but its information and position is kept nevertheless. The tokens are then a subject of existing patterns matching (240), which finds the best pattern for the current set of tokens. The information about the matching pattern, the metadata, and an ordered list of the free parameters is saved to datastore (250).

Figure 3A:
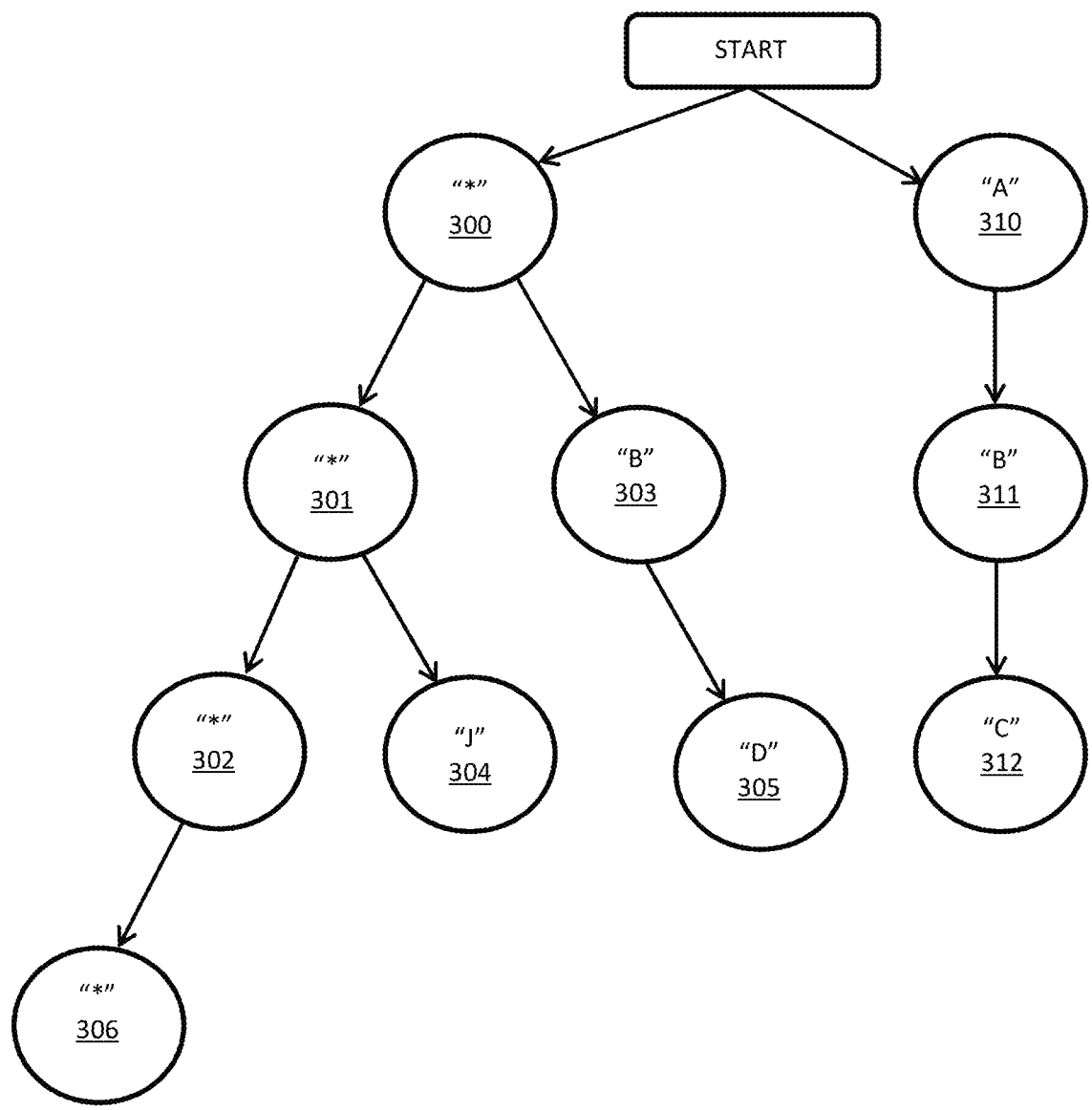
FIGS. 3A-3C depict an example trie expression of patterns.

FIG. 3A presents example patterns described using the trie structure. For simplicity the tokens will be shown per-letter; however, in practice it may be preferable to tokenize at the word level (character strings delimited by spaces—not necessarily dictionary words). Each of the nodes (300 to 312) can match either any token (wildcard token, e.g. "*") (300, 301, 302, 306) or a token with a specific label such as "B" (303, 311). Matching is being made iteratively for the sequence of input tokens. The matching pattern is described by the last matched node in sequence, which unequivocally defines what sequence of nodes matches the tokens. For simplicity, node identifications will match the figure element number for the figures. For example, the node with "Z" (304) has the node ID of "304". Using trie structure notation, the defined trie patterns are identified by the last node of the trie for the pattern. For example, pattern "*BD" would be identified as "305" for the trie shown in FIG. 3A.

Figure 3B:
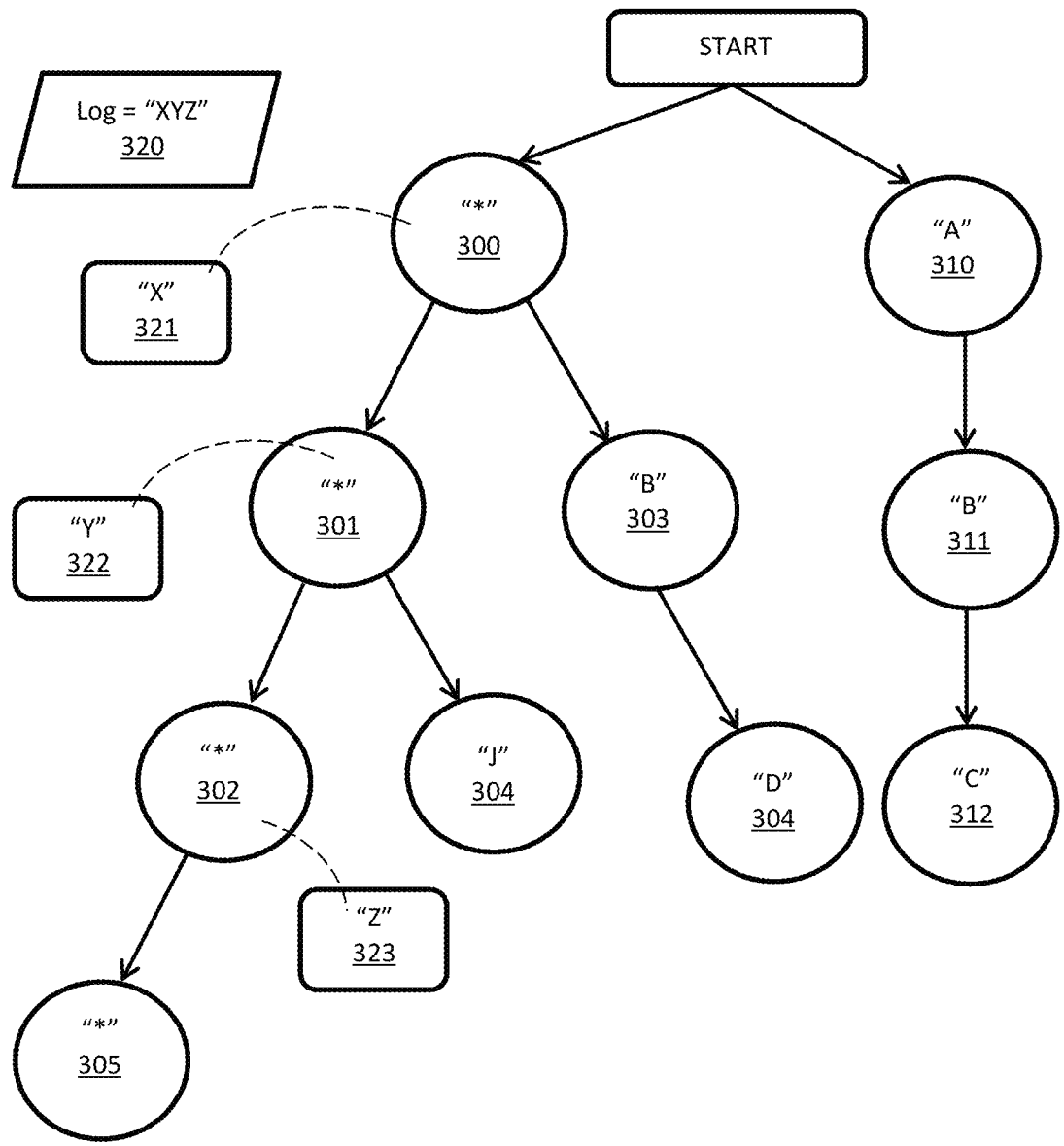

FIG. 3B presents an example of unambiguous pattern matching for a given log record for the trie shown in FIG. 3A. Suppose the given log record (320) is the text "XYZ". The log record (320) is tokenized into three tokens: "X" (321), "Y" (322), and "Z" (323). The tries are sequentially traversed from top to bottom. At the first level, all heads are being checked against the first token. The "X" token (321) is matched to the wildcard "*" (300): the only other available node for this trie, "A" (310), is not a match to "X" (321). The second token "Y" (322) is matched to second tier wildcard "*" (301): the only other second tier node branching from the matched first tier (300) is "B" (303) which is not a match to "Y" (322). At the third level, the third token "Z" (323) is matched to the third tier node "*" (302): the only other option for matching is "J" (304), which is not a match to "Z" (323). In the example shown in FIG. 3B, a single possible match was found, expressed by a sequence of nodes: 300 (300), 301 (301), and 302 (302). The pattern would be described by the node ID 302 (302) in such case because it is the last node ID in the pattern. As the all of the matches are "*", any three character string will match the pattern, so three parameters (one for each character, in this case) will need to be stored in the database to recreate the log record.

Figure 3C:
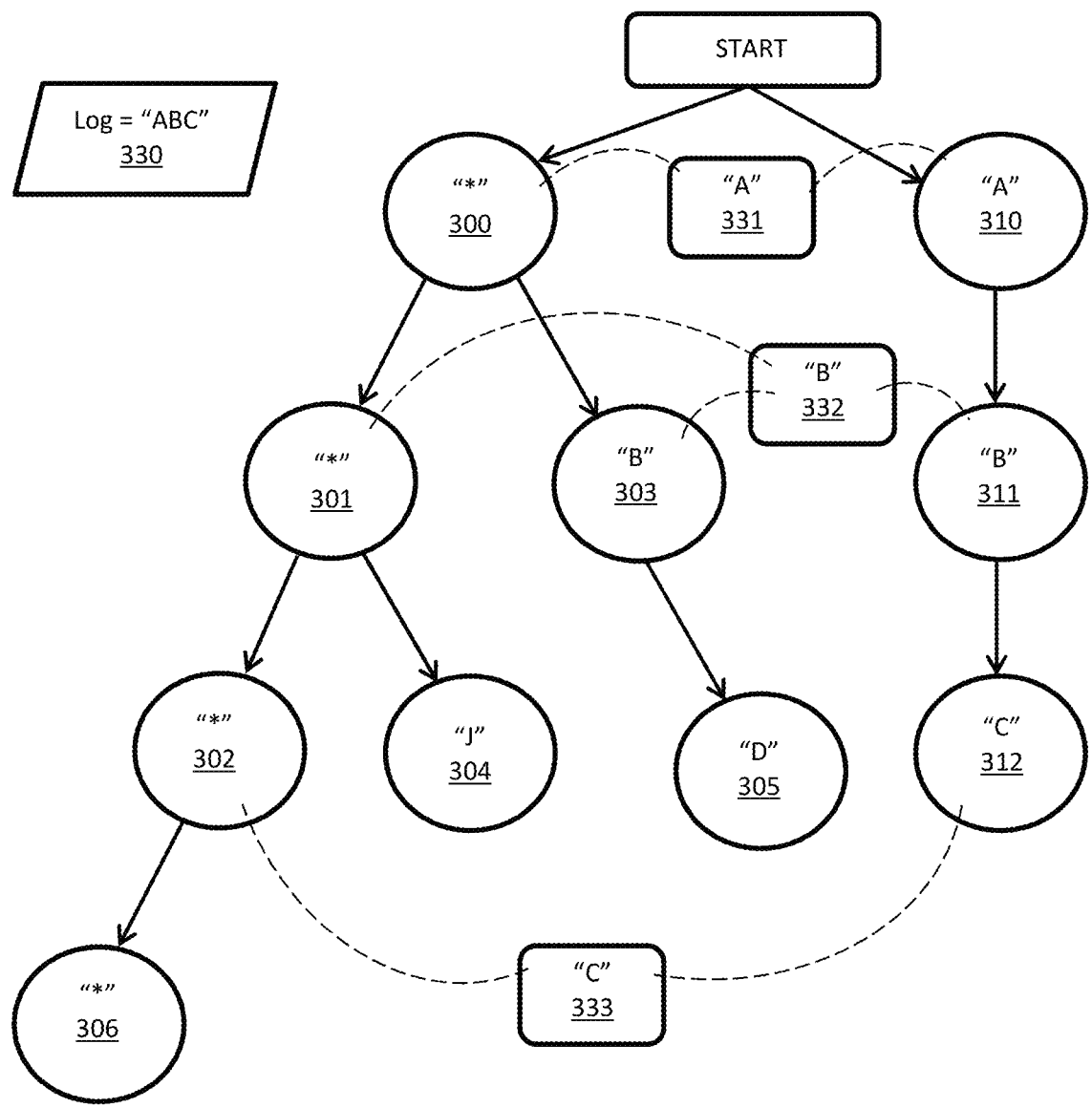

FIG. 3C presents an example of ambiguous pattern matching for a given log record for the trie shown in FIG. 3A. Suppose the log record (330) is now "ABC". The first token "A" (331) matches both the wildcard "*" (300) and "A" (310) at the first level. Branching from both of those nodes, the second token "B" (332) matches "*" (301), "B" after "*" (303), and "B" after "A" (311). The third token "C" (333) matches "*" (302) after "*" (301) and "C" (312) after "B" (311). Since no child of "B" (303), in this case just "D" (305), matches the third token "C" (333), the sequence starting "AB" (300, 303) does not match the log record (330).

However, there are now two possible sequences (i.e. patterns) that do match the log record (330): (1) the sequence [300, 301, 302] (302) and (2) the sequence [310, 311, 312] (312). However, the sequences are not equal in terms of required datastore. The first sequence (302) contains three wildcards (300, 301, and 302), so storing the record (330) as the first sequence (302) would require storing three parameters. In contrast, the second sequence (312) has no wildcards, so no parameters need to be stored: the entire record can be recovered just using the pattern ID (312) and the related metadata. Since the second pattern (312) has lower datastore requirements, the system can be structured to prefer the second pattern (312) over the first pattern (302) for storing the log. If the datastore requirements are equal for multiple patterns, the determination can be arbitrary or based off some other predefined criteria, such as selecting the first discovered pattern among all equally datastore intensive patterns.

As the number of alternative matching tries might be significant it is proposed to provide measures to limit maximum scope of searched tries. One possible solution is to use a windowed approach. Each window could hold the path with any match (to always have at least one pattern) and N best (so far) matches. With N equal to 256, at least eight levels are considered (as for each node there might exist any wildcard or exact match only). The system can start with a limited set of log patterns. The system can contain some pre-trained patterns for expediency, but in the minimal case it can just contain sets of "match-any" patterns (i.e. sequences of only wildcard nodes), based on which the specific patterns might then be trained by pattern discovery.

Figure 4:
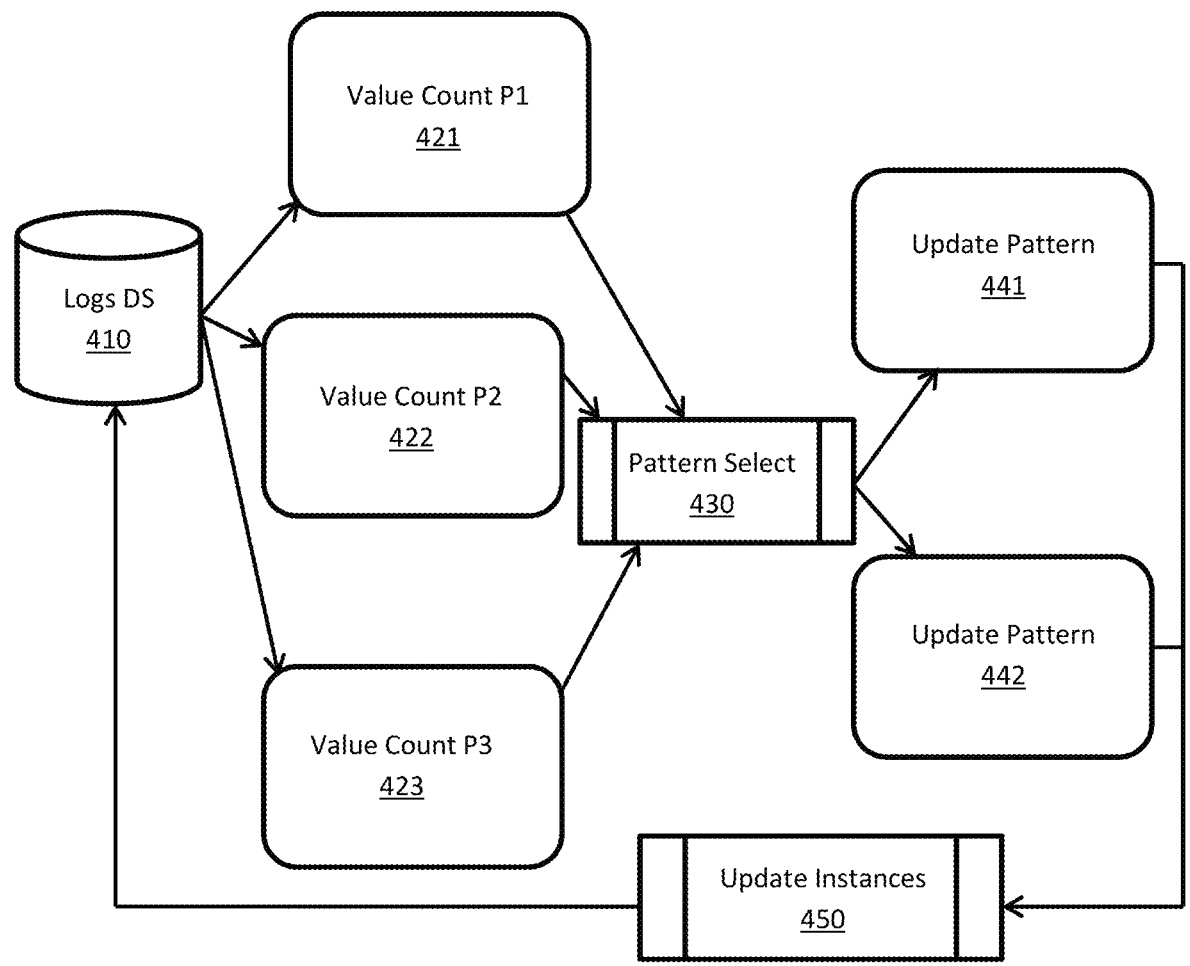
FIG. 4 depicts an example iteration of a pattern discovery process.

FIG. 4 depicts a pattern discovery system, which can either be run real-time with the log collection or as a batch process. Either all logs are being considered or just the recent ones to limit amount of data being processed. For each pattern, for each parameter, the values are being counted (421, 422, 423). If a token occurrence happens to be above minimum support (defined by a selected metric such as total count, information gain, chi-square, etc.), it is selected as a candidate for a new pattern. The candidates are sorted according to their support and the best non-conflicting ones are a basis for new patterns (430). The new patterns can be defined and saved (i.e. the trie structure representing the patterns is updated). Operations for updating existing logs can be defined (441, 442) and executed on the logs datastore (410).

Figure 5:
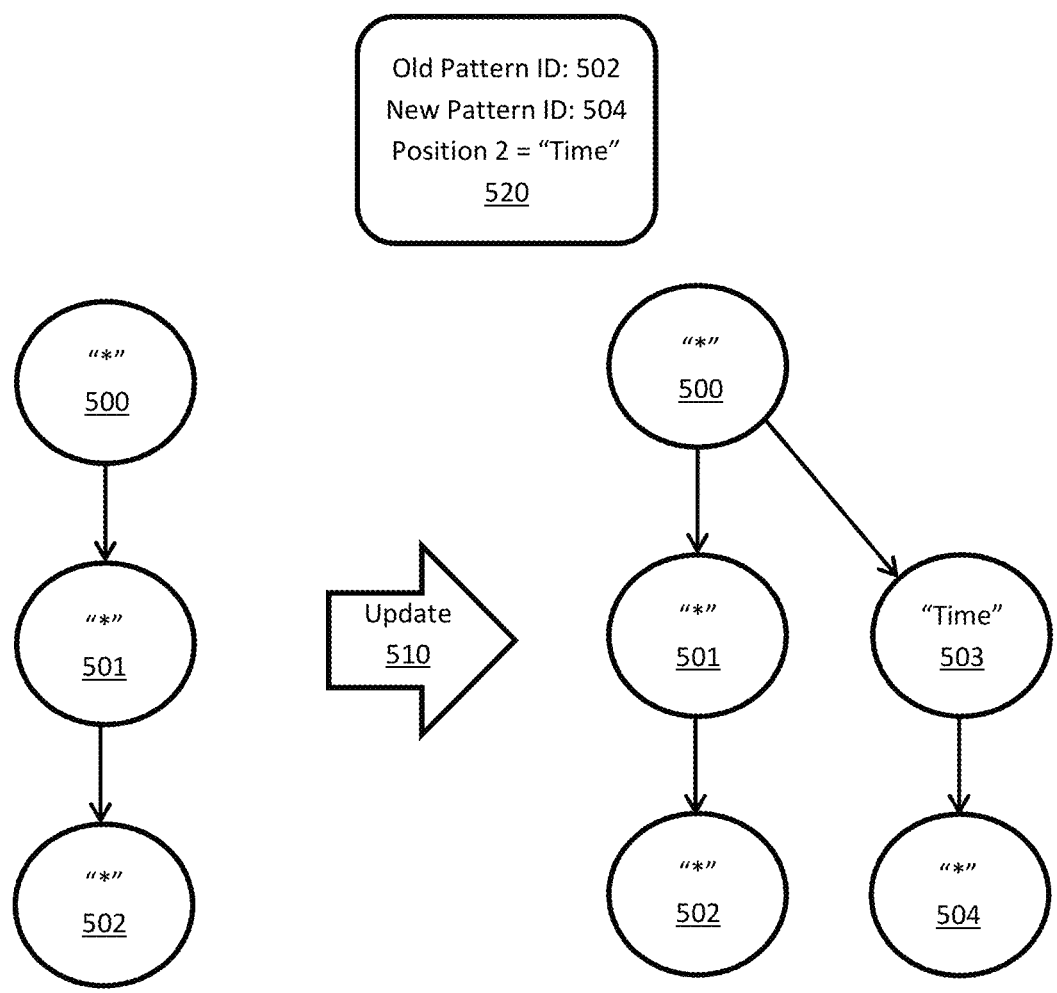
FIG. 5 depicts an example of new pattern discovery and its effect on the trie structure.

FIG. 5 presents an example of how a new pattern (520) can be discovered. Having counts of all parameters for pattern with ID=502 (constituted out of three nodes), the case with most significant support can be selected. In present example, the node with ID=502 is selected where parameter "Time" has occurred over a threshold limit of times (for example, over 200 times). A pattern update operation can be performed (510). The new node (503) can then be added to the trie structure as a non-wildcard match. The new node (503) is added at the second level after "*" (500). The suffix of the tree (502) is copied as descendants (504) of the newly created node (503). It will take all log records where the current pattern ID is equal to 502 and having the second parameter equal to "Time" and rewrite those as log records with pattern ID equal to 506, removing the second parameter, and replacing parameter at index 2 with the third parameter in the old log description. In other words, if the previous log record was [Pattern ID 502, Param1="Run", Param2="Time", Param3="Exceeded"], then the log record can be changed to [Pattern ID 504, Param1="Run", Param2="Exceeded"]. The same log is saved, but with lower total datastore cost (provided that more than one record is changed).

Figure 6:
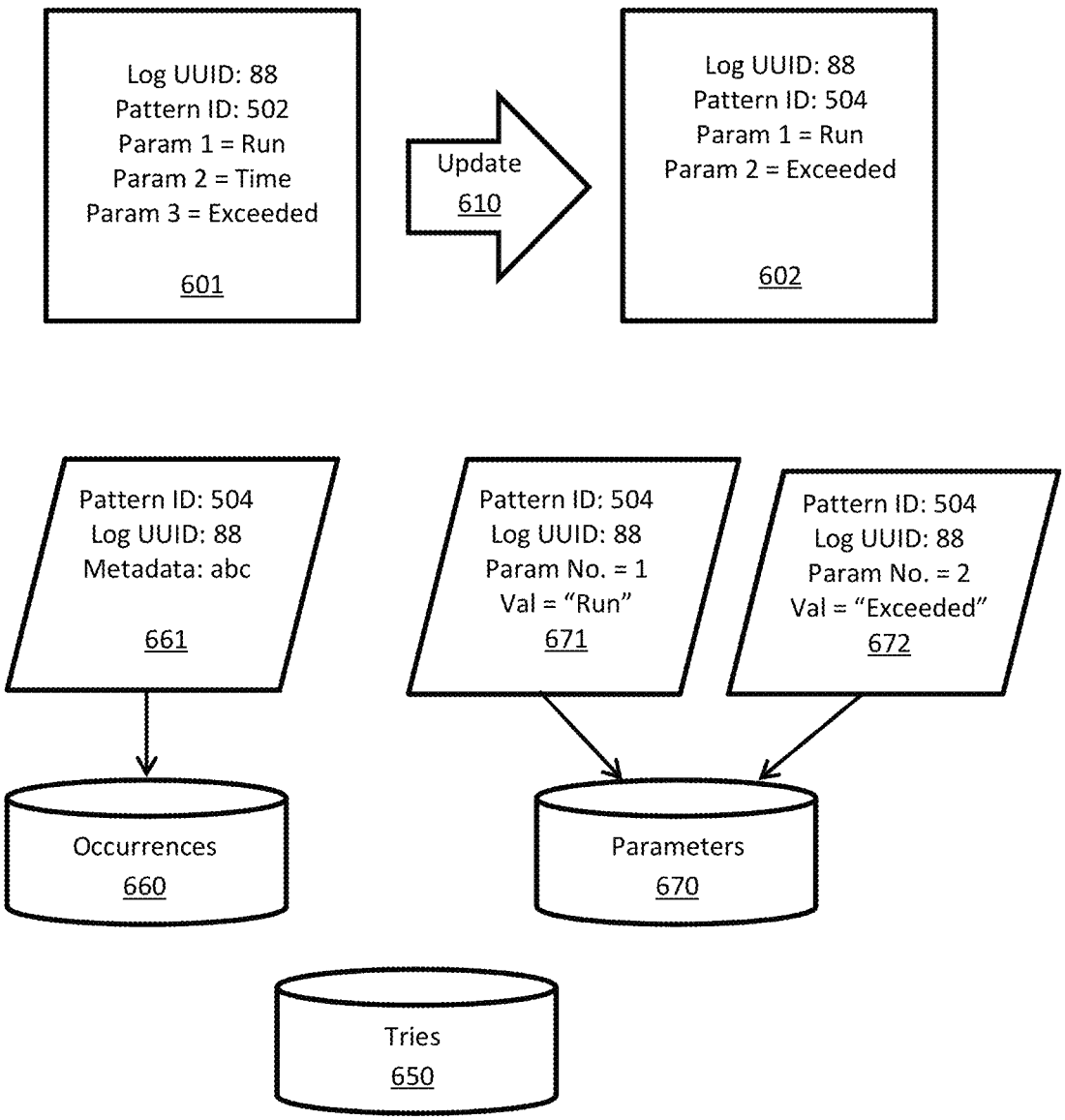
FIG. 6 depicts an example new pattern discovery being stored in the system.

This is presented in more detail in FIG. 6. The old log (601) matches the conditions (old pattern ID equal to 502, the second parameter equal to "Time"). After transformation (610) the same log (UUID=88) will be described by the new log record (602) with pattern ID equal to 506 and only two parameters. As it can be seen here, if there are many matching parameters, the discovery process will significantly reduce the number of tokens being stored in the database, effectively reducing each log to its pattern ID and the few parameters that do not repeat themselves very often.

The data involving log patterns can be saved to three separate stores (650, 660, 670). The first of those stores can be an in-memory database of log tries (650), which can be also persisted to disk storage. The trie database should not normally require a significant amount of memory space and is frequently accessed during the matching process, so fast memory access is preferred. The trie database structure is only changed during the discovery process. The second store contains specific pattern occurrences, together with its metadata (660). The last datastore (670) contains the free parameters. Stores 660 and 670 can effectively use columnar-oriented datastore means, such as Apache Parquet™ or Apache Kudu™.

Figure 7:
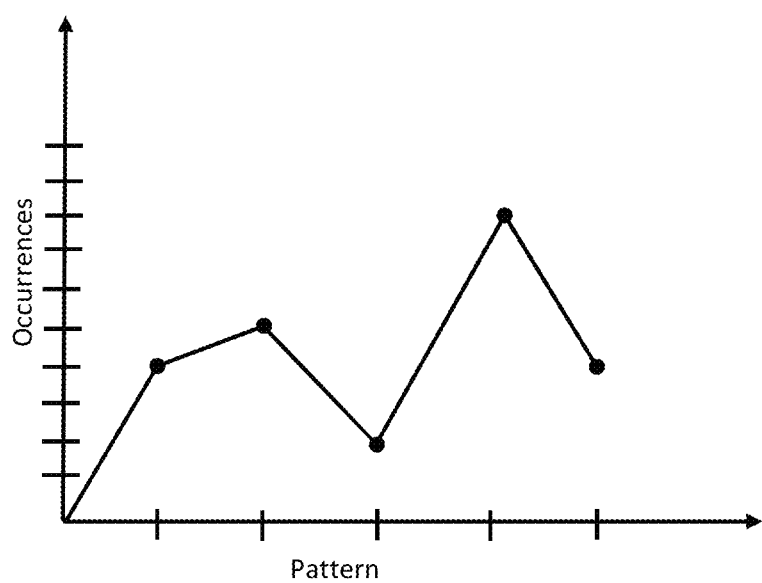
FIG. 7 depicts an example output of a query involving counting pattern occurrences.

Storing data in a trie format not only reduces the storage requirement (thus also making seek times faster), it also allows the use of new data analysis approaches, as each pattern might be considered a specific kind of event. A sample chart is presented in FIG. 7. A visualization of specific patterns can be made as shown in the graph. Additionally, when working in the area of a single pattern ID (or a set of pattern ID's) the parameters can have now very specific meanings relevant to a given event type. The user can tag the parameter numbers for each log, which would make it easier to collaborate on analytics involving those parameters.

Figure 8:
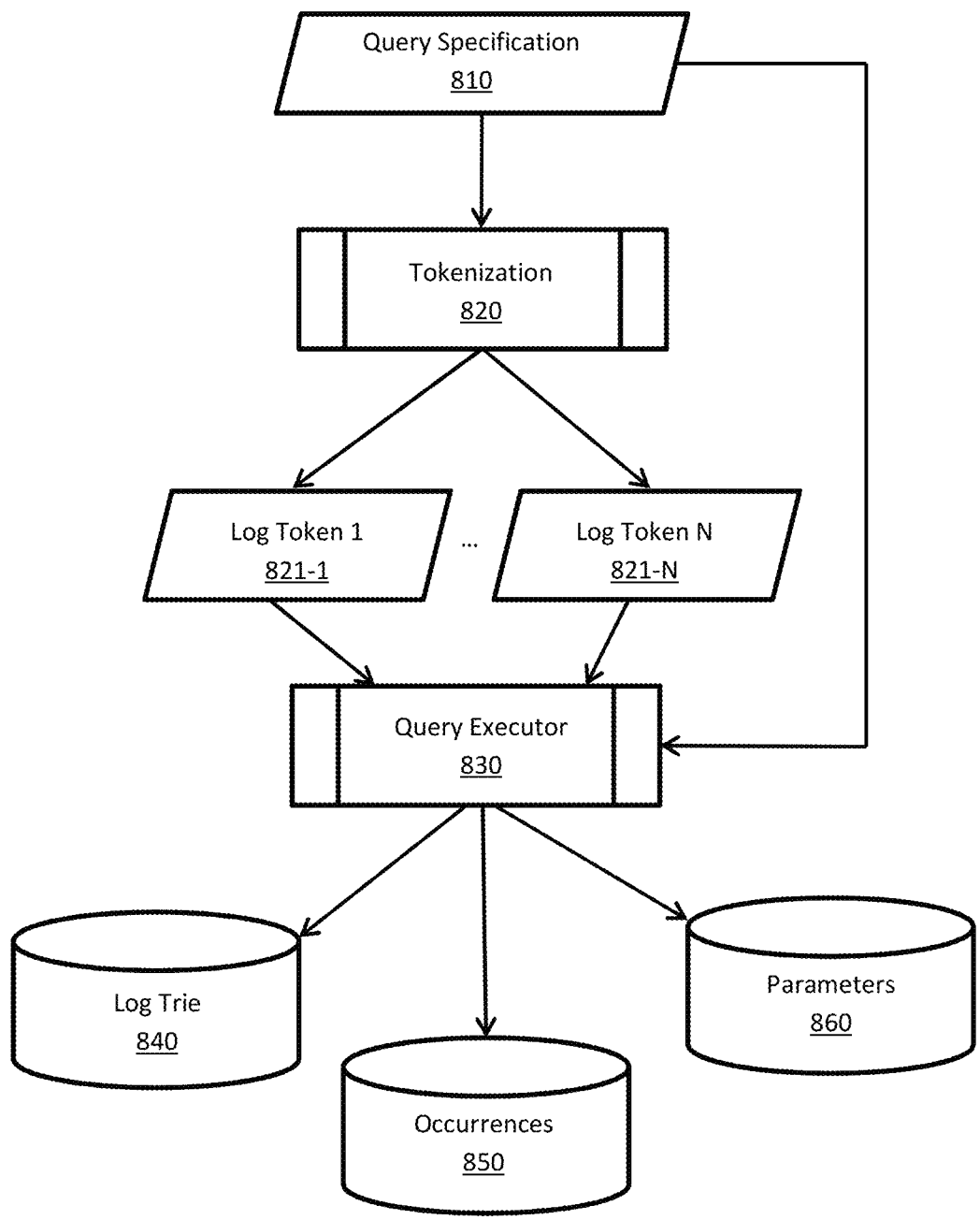
FIG. 8 depicts an example general architecture of a log query processing system for trie-stored logs.

An example of query execution is presented in FIG. 8. The query specification (810) can include specific pattern IDs, metadata (such as IP number, timestamp, date, etc.) or full text. If it contains full text, it can be a subject of tokenization (820) which produces tokens (821-1 to 821-N). All this data together can be sent to a query executor (830) which defines the criteria for all relevant storage types. If some tokens were specified, log tries (840) can be matched against the tokens and queries for log occurrences (850) and log parameters (860) can be prepared and executed.

Figure 9:
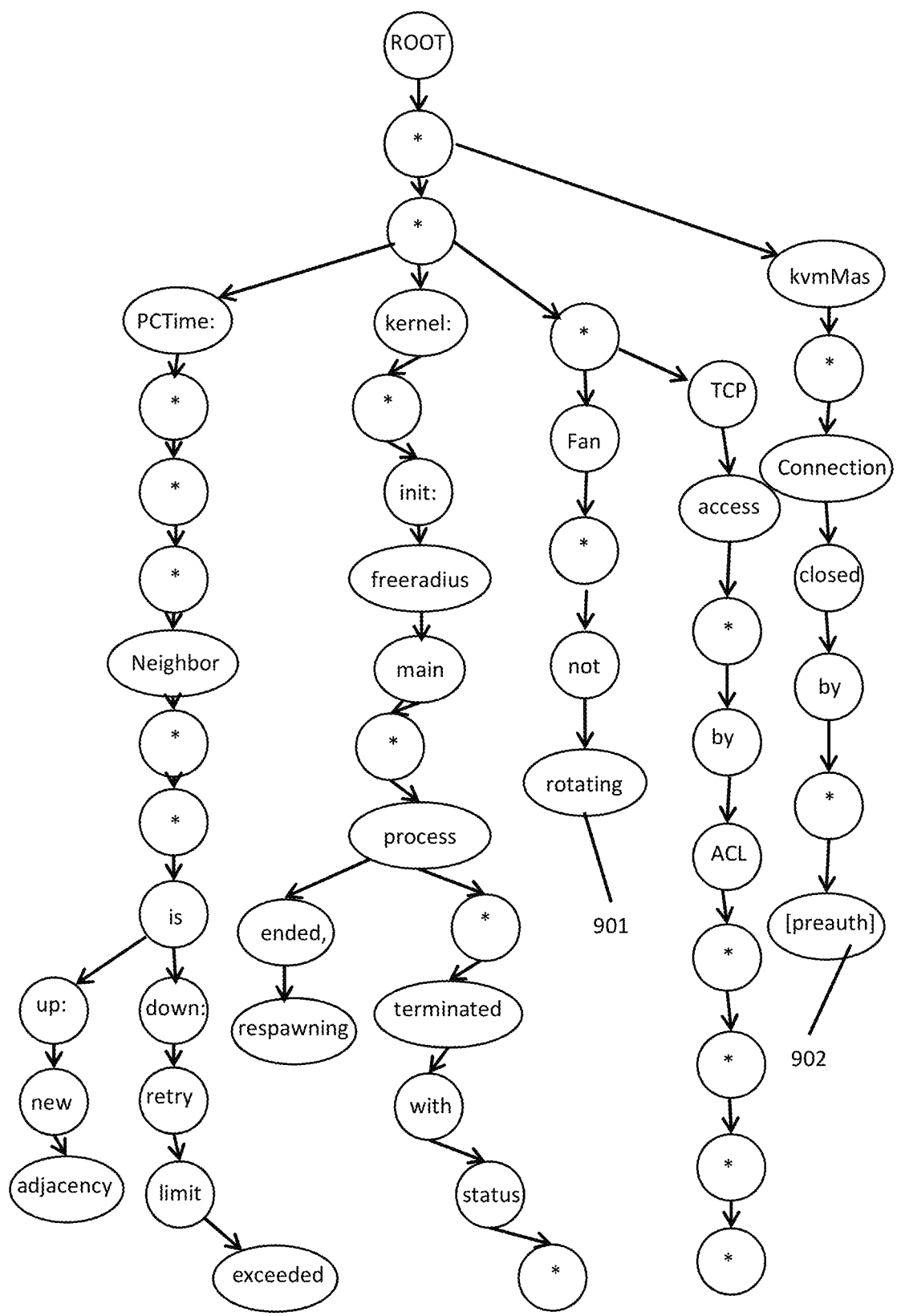
FIG. 9 depicts an example trie for computer logs.

FIG. 9 shows an example trie for a computer log that has been through multiple discoveries. For example, the log "ROOT 172.0.32.112 2012-08-23T20:08:32.000Z Apache warning hardw Fan 2 not rotating" would match pattern ID 901 (901) with four stored parameters (Apache, warning, hardw, and 2) and two stored metadata items (IP address and timestamp). The log "ROOT 172.0.32.112 2012-08-22T20: 05:32.000Z Apache kvmMas event Connection closed by 172.0.32.113 [preauth]" would match pattern ID 902 (902) with three stored parameters (Apache, event, and 172.0.32.113) and the two stored metadata items.

Figure 10:
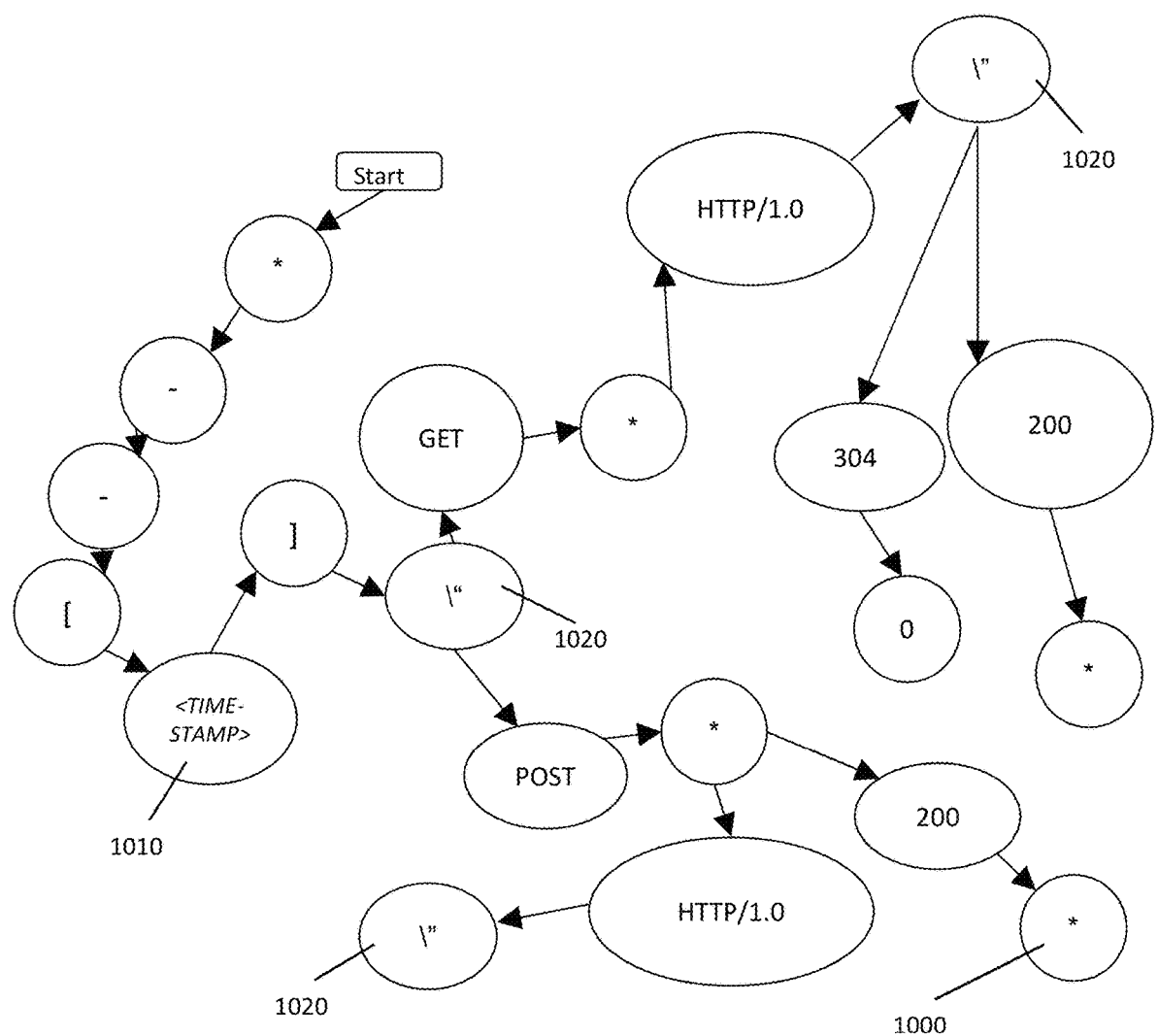
FIG. 10 depicts an example log trie structure with logs containing special characters.

FIG. 10 presents another example trie, built from HTTP server logs (in this example, public domain logs from a NASA-HTTP set of data—see ita.ee.lbl.gov/html/contrib/NASA-HTTP.html). The example log "pm9.j51.com—[01/Aug./1995:00:08:47-0400] "GET/images/NASA-logos-mall.gif HTTP/1.0" 200 786" could match pattern ID 1000 (1000), with "pm9.j51.com", the timestamp, "/images/NASA-logosmall.gif" and "786" as the parameters, consecutively.

For this example, the timestamp is designated by a special node (1010) that accepts any timestamp—like a wildcard, but with format limitations. In some embodiments, there may be several special case tokens and, therefore, several specific types of nodes for those special cases. One example is a timestamp. The timestamp might be constituted by characters that would normally be extracted to more than one token; however the system can be made aware of several common timestamp formats and consider this as a special type of token (and a special type of node) such that the entire timestamp is extracted to one token. An alternative could be to parse the timestamp from the log, associate the timestamp with log metadata, and remove the timestamp characters from the actual saved log content.

Similarly, in some embodiments there can be options for handling special characters. One example is shown with the quotation marks as used in the example log for FIG. 10, which can be specially parsed from the log and stored in their own nodes (1020), even though they are concatenated to other text. Alternatively, they can be stored in the nodes with the text they are concatenated to. Depending on the parsing system, special characters might need to be delimited in some way, such as with a backslash character, "\", as shown in FIG. 10 for the quotation marks (1020).

The method with which the tokenization process is run will have a large impact on the number of parameters and their length in the trie structure. There are several possible methods.

Figure 11:
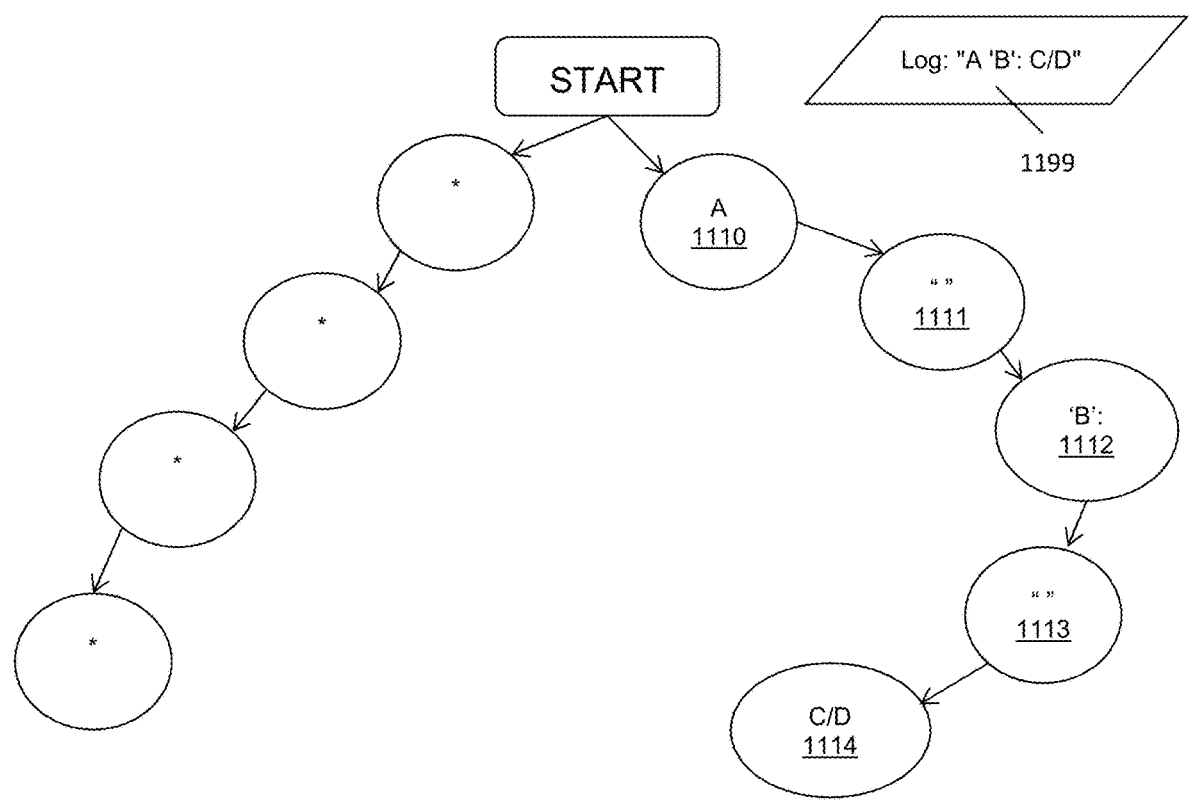
FIG. 11 depicts an example log trie structure with white space delimiters.

FIG. 11 depicts an example log trie structure with nodes created by using only white space (1111, 1113) as a word splitter (delimiter). In this example log (1199): "A 'B': C/D" has been split into 5 tokens: "A" (1110), " " (1111), "'B':" (1112), " " (1113), and "C/D" (1114). Please note that in this example the white space itself is considered as a normal token (1111, 1113). But in a different approach it can be considered as a delimiter between every node, or it can be added to the specific node as a part of it (for example, storing "A " in the node (1110) instead of just "A". The same approach can be applied to any kind of delimiter, so long as it allows to the original log message to be reconstructed from the trie structure. This is required so that the system can show the user the original log message text.

In some embodiments, a more advanced approach to the tokenization process can include more special characters (like: / \ ' { } [ ]: " , !) as log string delimiters. In such an approach, the tokenization process will still be well defined. Tokens can sometimes be much shorter, and if so the number of possible tokens will be bigger. This is an important fact because the trie log structure memory requirements will vary significantly depending on the choice of delimiter character.

Figure 12:
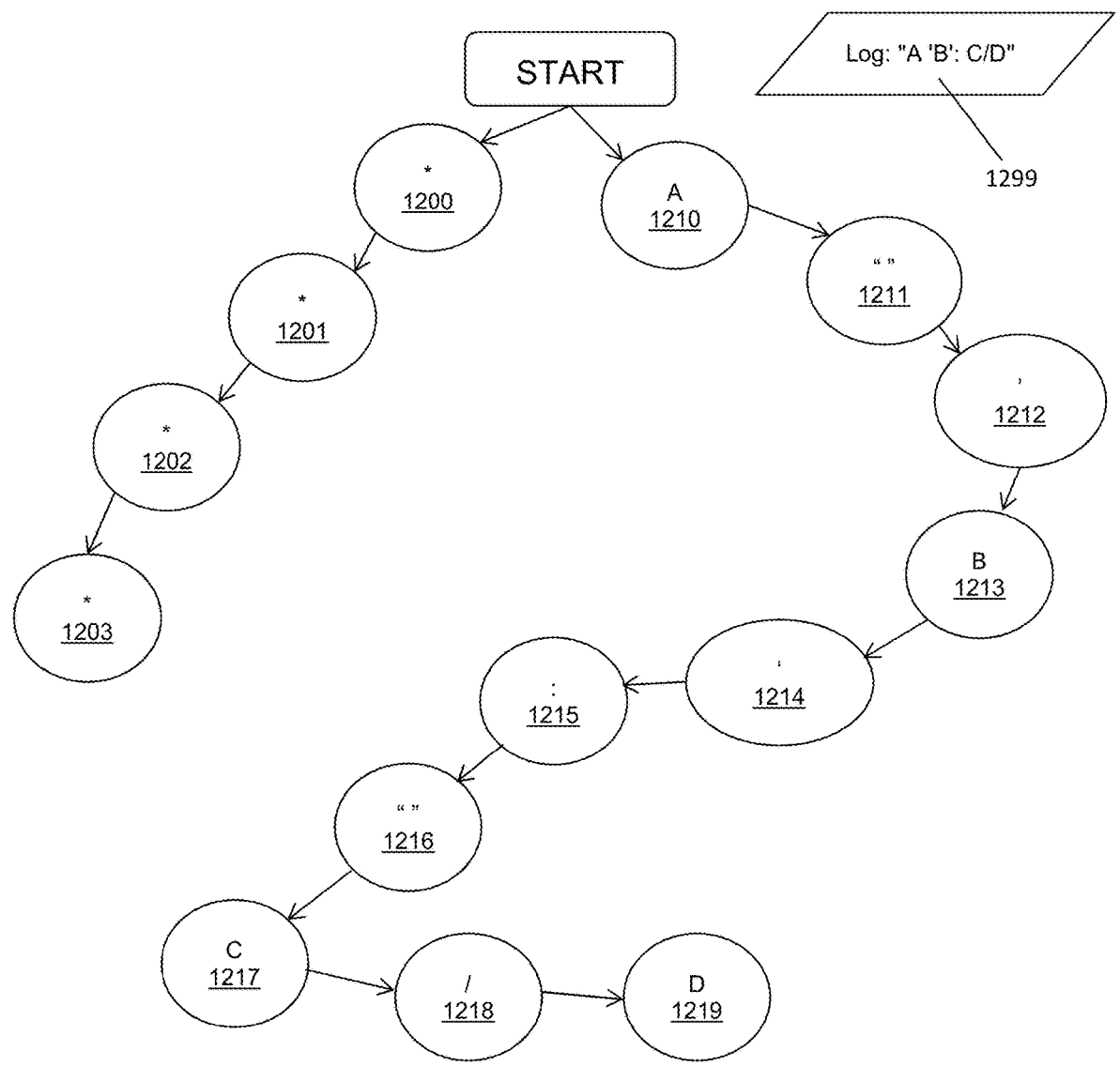
FIG. 12 depicts an example of the tokenization process where special characters are given separate nodes.

FIG. 12 shows an example of the tokenization process where special characters like: "/" and ":" have been used to create nodes (1218, 1215). When we compare the last tokens from FIG. 11 (1114) and FIG. 12 (1219), it can be seen that, if the "D" value is a parameter that can change independently of the "C" and "/" parameters, it might be a better solution to give it its own node (1219). For the node containing "C/D" together (1114), the whole node needs to be converted and stored into database, even if the "D" value changes. For example, if a new log comes in ending with "C/E", then a "C/E" node would be created at the same level as the "C/D" node (1114).

Figure 13:
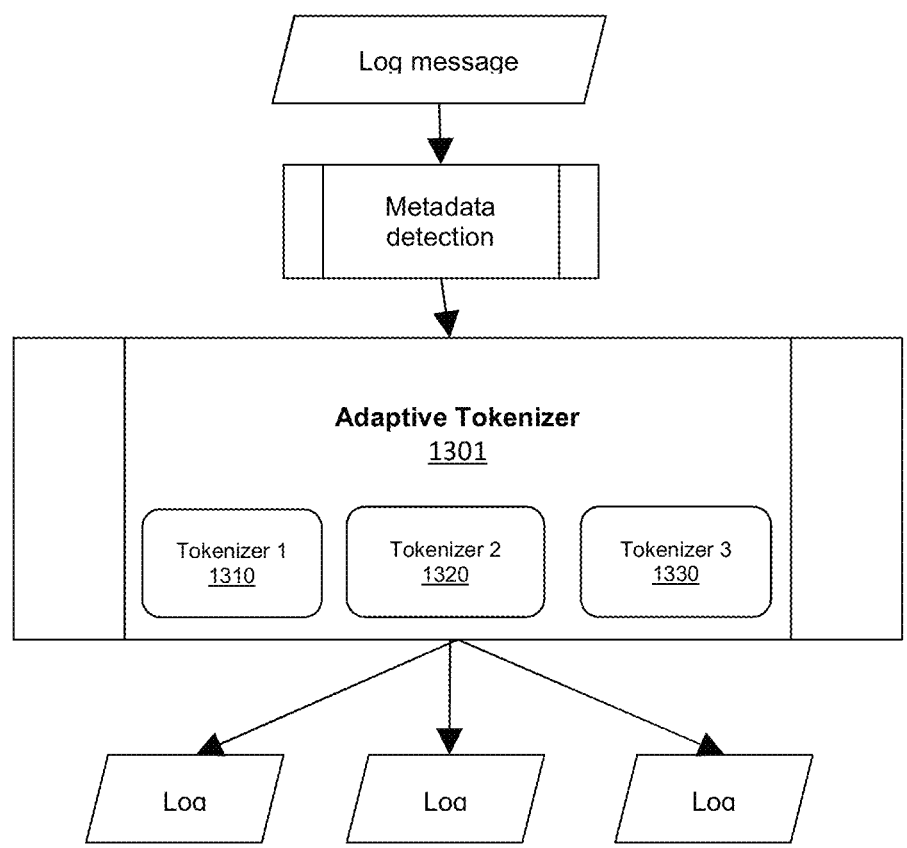
FIG. 13 depicts an example of a system with an adaptive tokenizer.

Sometimes, for the best results regarding optimization and performance, it may be best to define more than one tokenizer. In some embodiments a message log can be categorized by an adaptive tokenizer (1301). The selector selects the best tokenizer (1310, 1320, 1330) for that particular log message, as seen in FIG. 13.

Figure 14:
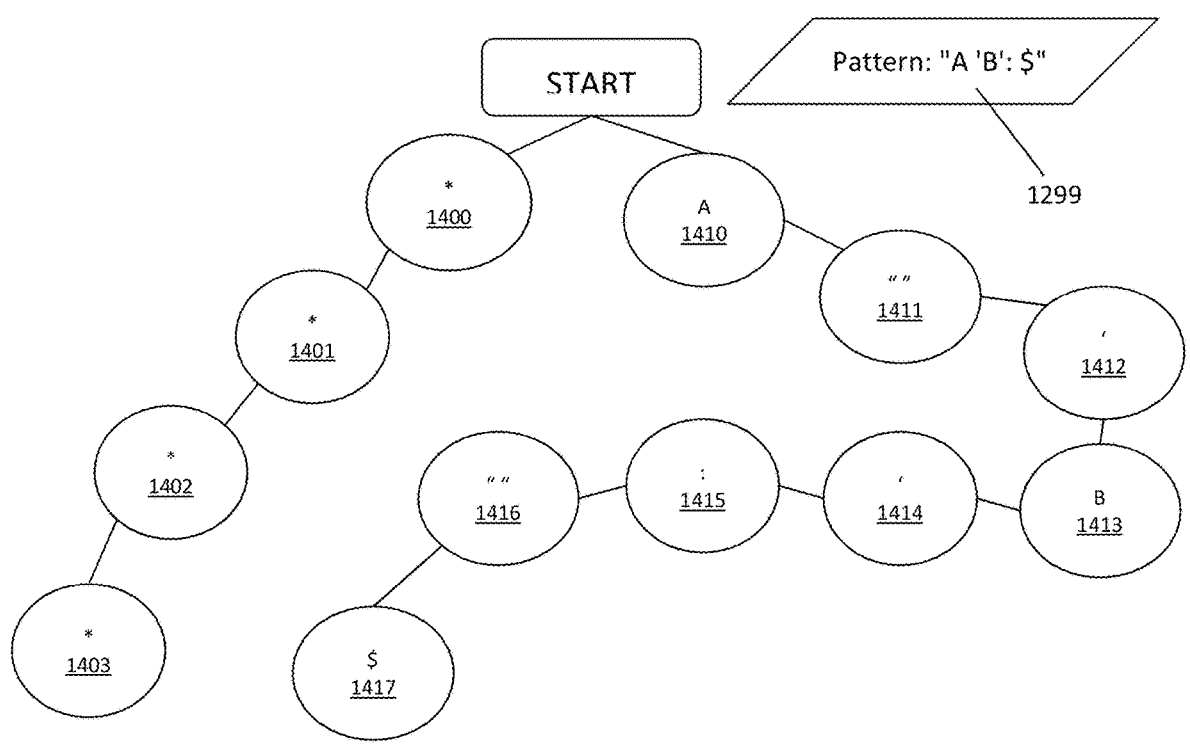
FIG. 14 depicts an example log trie with a multi-token wildcard.

In order to create proper patterns for such cases it is very helpful to define types of node in log trie structure. Possible types of nodes include:

1) Single well defined—for such node, a token is expressed by specific: word, number, or even single character. It never represents a parameter. On FIG. 14 each node except the last on the right-side branch (1410, 1411, 1412, 1413, 1414, 1415, 1416) is well defined.

2) Single-token wildcard—in contrast to the well defined, the left-side branch (1400, 1401, 1402, 1403) has only wildcard (i.e. undefined) parameters. While the defined nodes (1410-1416) in this example represent single characters, the wildcard-type nodes (1400-1403) can represent either a single character or more than one character, depending on how the wildcards are defined. Single-token wildcard nodes express tokens that can be a single word, number, or character, but are not defined as a specific word, number, or character for that parameter. Under common convention, it is expressed by a star character, "*", but other designations can be used as well.

3) Multi-token wildcard—a type of node which expresses many single undefined tokens. It is very useful when a sequence of tokens create single value or parameter, for example in a text string. Using this token type, some nodes can be written as a single node that represents the three different tokens as a one parameter. Under common wildcard convention it is expressed by a dollar sign, "$", character, but other designations can be used as well. This is depicted on FIG. 14, where only one node (1417) replaces three nodes from FIG. 12 (1217, 1218, 1219). When such a node is present in the end of the pattern, it can contain any number of tokens. When it is present somewhere in the middle of pattern, the tokens sequence can be explicitly ended by the presence of nodes/tokens which have been previously determined not to belong to the parameter represented by the node sequence.

4) Special expression—a type of node which expresses parameters created by a token or tokens described by a rule or expression. Generally, it is a very flexible node. Everything here depends on its definition. For example, "$(3)" can mean that only (or a maximum of) three tokens should be considered as one parameter (i.e. one node in the trie). The designation "$(2,3)" could mean that two or three tokens could be used. Other conventions could also be used.

5) Custom—a type of node which expresses a token with specific content. It is also quite flexible parameter and meaning depends on definition. The difference between this and the "single undefined", "multiple undefined", and "special expression" nodes is that the custom node is intended for a specific parameter, rather than any parameter that matches an expression.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A log processing system comprising:
a processor;
a datastore connected to the processor;
a module running on the processor collecting logs from a plurality of computer applications, the logs including timestamped strings listing at least one of computer hardware events, computer software events, and messages sent to or from a computer;
a module running on the processor tokenizing a log into a sequence of tokens to be used as keys in a stored trie, wherein the sequence of tokens comprises character strings delimited by spaces;
a module running on the processor, matching iteratively, token by token, the sequence of tokens to a sequence of nodes in the stored trie, wherein the sequence of nodes comprises well defined type and wild card type nodes corresponding to the tokens, each node in the sequence of nodes being single well defined, single-token wildcard, or multi-token wildcard type, wherein a last matched node in the sequence of nodes is associated with a pattern identifier of a pattern represented by the sequence of nodes, and wherein the matching is performed at least in part by i) using a node as a log token in case the log token is matched to a single well defined type node and ii) generating parameters for later storage in case the log token is matched to a wildcard type node;
a module running on the processor extracting the parameters and metadata from the log, the metadata comprising at least one of IP address, timestamp, and date;
a module running on the processor storing the log to the datastore as a combination of the pattern identifier associated with the last matched node in the sequence of nodes in the stored trie, the parameters, and the metadata, wherein the datastore contains a separate datastore for storing pattern identifiers, and in response to determining that datastore requirements are not equal for multiple possible sequences of tokens, then a sequence with a lowest datastore requirement is selected for the storing;

a module running on the processor counting instances of a given parameter of the parameters and, when a count of the given parameter goes over a pre-defined threshold number for a given log, adding a non-wildcard type node to the stored trie corresponding to the given parameter and modifying the given log and all subsequent logs to use the node as a new token before the storing to the datastore;

a module running on the processor making a query by tokenizing a query request and matching the tokenized query request to patterns of the stored trie; and a module running on the processor updating existing logs based on the new token.

2. A computer-based method for improving the storage of computer logs, the method comprising:

collecting logs from a plurality of applications, the logs including timestamped strings listing at least one of computer hardware events, computer software events, and lists of messages sent to or from a computer;

tokenizing, by a processor, a log into a sequence of tokens to be used as keys in a stored trie, wherein the sequence of tokens comprises character strings delimited by spaces;

iteratively matching the sequence of tokens, by the processor, token by token, to a sequence of nodes in the stored trie, wherein the sequence of nodes comprises well defined type and wild card type nodes corresponding to the tokens, each node in the sequence of nodes being single well defined, single-token wildcard, or multi-token wildcard type, wherein a last matched node in the sequence of nodes is associated with a pattern identifier of a pattern represented by the sequence of nodes, and wherein the matching is performed at least in part by i) using a node as a log token in case the log token is matched to a single well defined type node and ii) generating parameters for later storage in case the log token is matched to a wildcard type node;

extracting, by the processor, the parameters and metadata from the log, the metadata comprising at least one of IP address, timestamp, and date;

storing the log as a combination of the pattern identifier associated with the last matched node in the sequence of nodes in the stored trie, the parameters, and the metadata, wherein the datastore contains a separate datastore for storing pattern identifiers, and wherein in response to determining that datastore requirements are not equal for multiple possible sequences of tokens, then a sequence with a lowest datastore requirement is selected for the storing;

counting instances of a given parameter and, when a count of the given parameter goes over a pre-defined threshold number for a given log, adding a non-wildcard type node to the stored trie corresponding to the given parameter and modifying the given log and all subsequent logs to use the node as a new token before the storing to the datastore;

making a query by tokenizing a query request and matching the tokenized query request to patterns of the stored trie; and updating existing logs based on the new token.

* * * * *